United States Patent [19]

Sossamon

[11] Patent Number: 4,951,890
[45] Date of Patent: Aug. 28, 1990

[54] DRILL-OPERATED ADAPTER FOR UNWINDING FISHING LINE FROM REELS

[76] Inventor: Terry Sossamon, 6721 Orr Rd., Charlotte, N.C. 28213

[21] Appl. No.: 421,519

[22] Filed: Oct. 13, 1989

[51] Int. Cl.$^5$ .................... B65H 54/00; B65H 54/74; B65H 75/00
[52] U.S. Cl. .................................... 242/47; 242/54 R
[58] Field of Search .................. 242/47, 53, 54 R, 96, 242/106

[56] References Cited

U.S. PATENT DOCUMENTS

| | | | |
|---|---|---|---|
| 4,196,864 | 4/1980 | Cole | 242/106 X |
| 4,290,584 | 9/1981 | Eckels et al. | 242/106 X |
| 4,728,048 | 3/1988 | Batson | 242/47 |

Primary Examiner—Stanley N. Gilreath
Attorney, Agent, or Firm—Shefte, Pinckney & Sawyer

[57] ABSTRACT

Apparatus for unwinding fishing line from a fishing reel comprising a hand-held electric drill, a conventional, preferably plastic, used beverage container, and an adapter having a first threaded connecting portion for receiving the threaded neck portion of the beverage container and a second projecting portion that is received within and engaged by the chuck of the drill, whereby when the components are assembled the drill can be operated to rotate the beverage container and permit fishing line from a fishing reel to be wrapped about the outer cylindrical surface of the container so as to remove the fishing line from the fishing reel and collect the line in a neat package on the bottle for ultimate disposal.

4 Claims, 2 Drawing Sheets

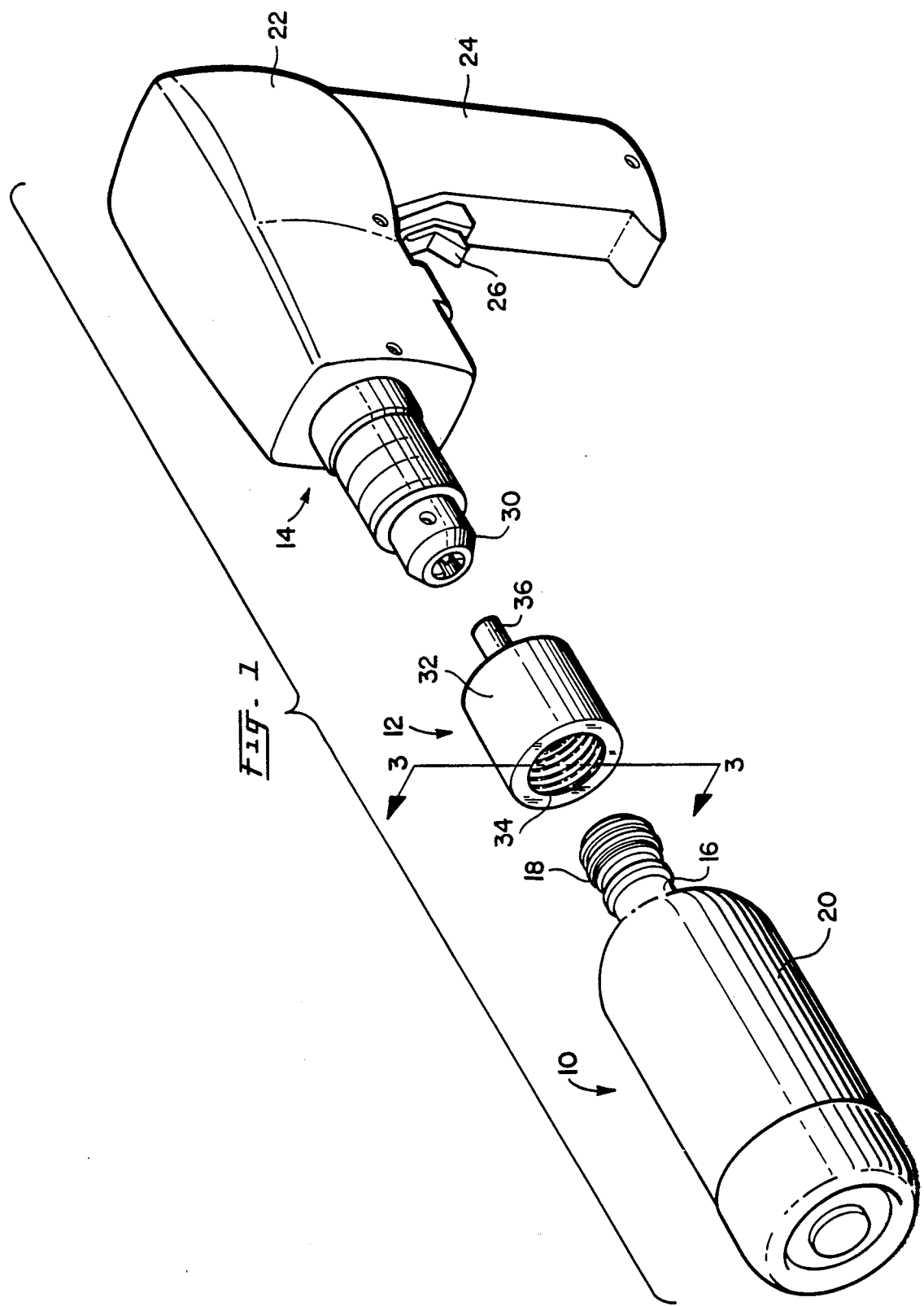

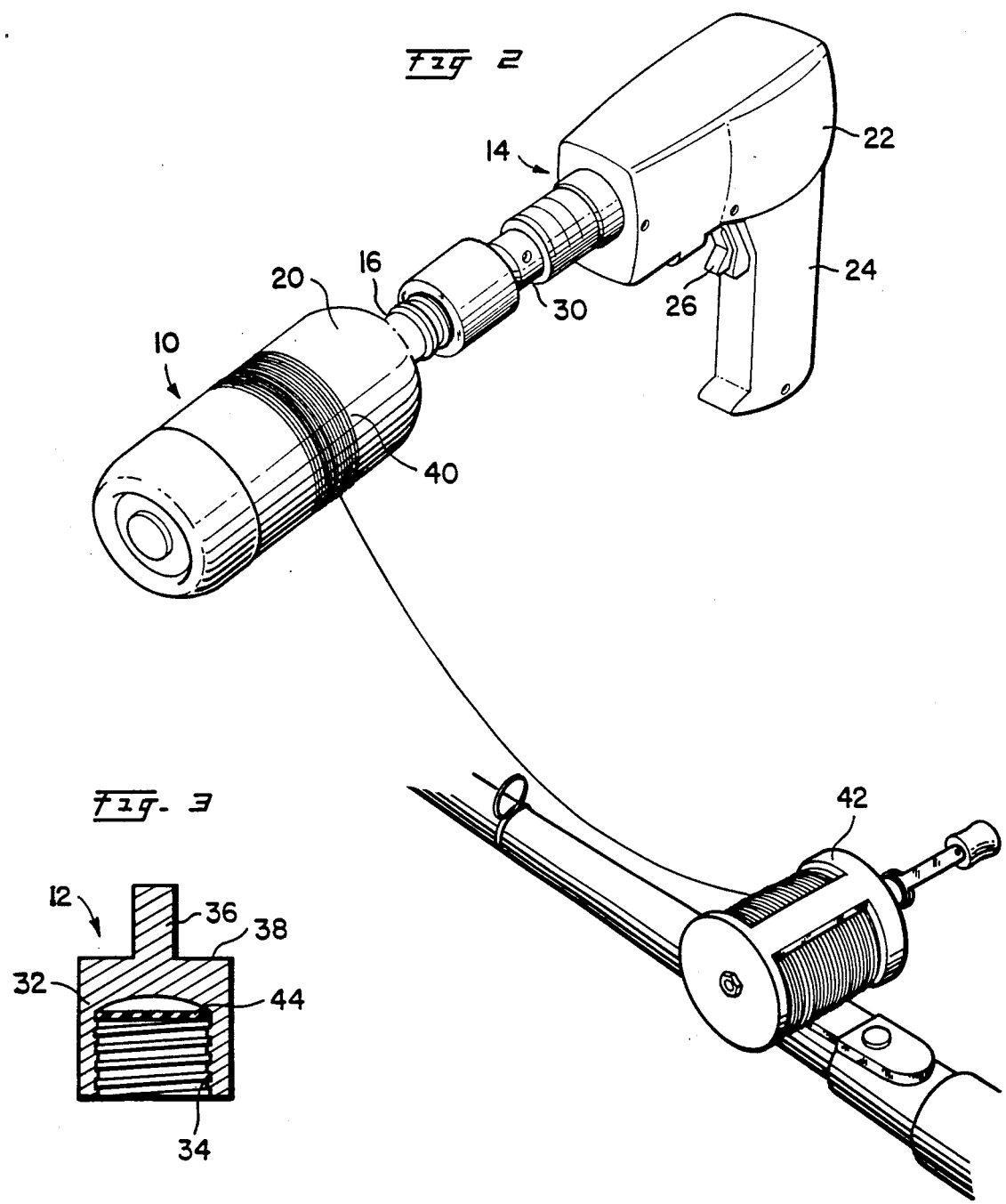

DRILL-OPERATED ADAPTER FOR UNWINDING FISHING LINE FROM REELS

BACKGROUND OF THE INVENTION

The present invention relates generally to apparatus for quickly and easily removing used fishing line from a fishing reel, and which permits the fishing line to be collected for easy and safe disposal.

Fishermen frequently encounter the problem of removing large quantities of used fishing line from a fishing reel, and while the need to remove such used line can arise in a number of different situations, the most common circumstances are to replace the used line with a line of a different test or to reload the reel with a fresh supply of new line when the used line is no longer serviceable.

Presently, the most common way to remove used line is simply to pull it off the fishing reel manually, and since the line is generally wrapped somewhat tightly around the reel, the manual removal of the used line is a time consuming and unpleasant chore, particularly where the manual unwinding must be carried out within the confines of a relatively small fishing boat on the water.

The difficulties associated with manually unwinding used line are further exacerbated by the problem of what to do with the used line after it has been removed from the reel. Fishermen seldom take the time to simultaneously wind the used line on another core, and, as a result, the used line is generally permitted to simply accumulate in a disoriented and tangled bundle that can occupy a large space if the used line has an extended length. Moreover, less than careful fishermen will frequently dispose of this bundle of tangled line by dumping it overboard into the water where it can cause serious and long term problems to the natural environment, as well as to other boats and fishermen (e.g. by becoming tangled about the screw of the boat).

Apart from the aforesaid manual unwinding of used line, some tackle shops have large stationary equipment that includes an electric motor having a plastic reel attached thereto for rotation by the motor so that used line can be wound onto the plastic reel. This plastic reel is formed in two parts that can be separated, after the winding operation is complete to permit removal of the used line from the plastic reel. This commercial equipment has a number of disadvantages from both the tackle shop owner's and the customer's standpoint. As to the tackle shop, this commercial equipment is expensive to buy and operate, it is not suited to home use, and it does not provide any convenient way to dispose of the used line when it is removed in bulk from the plastic reel. From the fisherman's or customer's standpoint, taking a reel to a tackle shop for replacement of used line on the aforesaid commercial equipment is undesirable for many reasons. First, it is inconvenient to make the trip to the tackle shop, and, once there, the tackle shop may not have the right line or may not have the time to put on new line while the fisherman waits. Also, it is necessary to take the reel off of its rod before taking it to the tackle shop, which is often a time consuming job where large salt water reels are being removed. Finally, the fisherman or customer often cannot see the new line being put on the reel, and sometimes the tackle shop will put old line on the reel rather than new line, or apply the line to the reel in an improper manner.

There is also a commercially available device which is battery operated and about the size of a flashlight, and it includes a small rotor element that is rotated by the batteries and includes a construction which permits the end of a used fishing line to be inserted therein and pulled off of a fishing reel as the small rotor element is turned whereupon the line simply drops to the floor as it is pulled off of the fishing reel. Obviously, this device suffers the disadvantage of leaving fishing line in a pile, and because the rotor element is small, it requires many rotations when long lengths of fishing line are being removed, thereby reducing the effective life of the batteries to a point that the device may be impractical for many fishing line removal operations.

In accordance with the present invention, the aforesaid problems of unwinding used line from a fishing reel are substantially eliminated by a simple and inexpensive apparatus that permits the used line to be quickly and easily unwound from the reel and automatically collected in an organized form that permits it to be readily and properly disposed of without endangering the environment.

SUMMARY OF THE INVENTION

The present invention provides a method and apparatus for unwinding used fishing line from a fishing reel which includes a bottle having a threaded neck portion and an enlarged generally cylindrical body portion about which the used line can be wound, a drive means having a motor-driven rotatable chuck that is adapted to receive and engage a connector inserted therein, and an adapter having a first connecting portion for threadably engaging the neck portion of the bottle to secure the adapter thereto, and a second connecting means received and engaged by the drive means to secure the adapter means thereto, whereby when the drive means is operated the bottle will be rotated to withdraw the used line from the fishing reel and wind the used line on the exterior surface of the bottle for disposal therewith. Preferably, the bottle is a conventional soda pop bottle or the like of the type which are frequently found on fishing boats and in other areas where sport fishing occurs, and the drive means is a conventional electric drill, which can be either a portable battery-operated drill or an electric drill connectable to house current.

To use the above-described apparatus, the threaded neck portion of the soda pop bottle is secured to the adapter by screwing the neck portion into a first threaded receptacle on the adapter which receives and engages the neck portion, and securing the adapter to the chuck of the drill by inserting a second projecting portion of the adapter into the chuck and tightening the chuck. With the parts thus assembled, a few turns of one end portion of the used fishing line on the fishing reel are wrapped about the exterior surface of the soda pop bottle, and the drill is then operated to rotate the bottle at a rapid speed so as to unwind the used line from the fishing reel and wind it about the exterior surface of the bottle. After the entire supply of used line has been removed from the fishing reel and wrapped about the bottle, the bottle can then be unscrewed from the threaded receptacle of the adapter for proper disposal.

BRIEF DESCRIPTION OF THE DRAWINGS

FIG. 1 is an exploded view of the several components of the apparatus of the present invention;

FIG. 2 illustrates the apparatus of the present invention in its assembled form for removing used line from a fishing reel; and FIG. 3 is a section view taken along a vertical plane through the adapter of the present invention.

DESCRIPTION OF THE PREFERRED EMBODIMENT

Looking now in greater detail at the accompanying drawings, FIG. 1 illustrates the several components of the present invention in a disassembled and somewhat exploded view, such components including a bottle 10, an adapter 12, and an electric drill 14.

Preferably, the bottle 10 is a typical or conventional plastic soda pop bottle formed with a reduced neck portion 16 having the usual threads 18 thereon for normally receiving the cap for the bottle, and an enlarged generally cylindrical body portion 20 in which the soda pop or other liquid is normally contained.

The drill 14 is, preferably, a conventional battery-operated electric drill that includes a casing 22 formed with a pistol grip handle 24, a finger-operated on-off "trigger" switch 26, and a cylindrical chuck 30 that is manually turned to open and close jaws (not shown) within the chuck 30, all in a well-known manner. Although the drill 14 can be an electric drill having a conventional electric cord to connect the drill 14 to an electrical outlet, it is preferred that the drill 14 be battery-operated, with the batteries contained within the pistol grip 24, so that the drill can be carried on fishing boats, or used in other remote areas where electrical outlets may not be available.

The adapter 12 is preferably formed of aluminum, but it can be formed of any suitable material, and it includes a first connecting portion in the form of a female receptacle having threads 34 provided at the interior surface thereof, these threads being formed to receive and engage the threads 18 of the neck portion 16 of the bottle 10. In this regard, it is to be recognized that while soda pop and similar liquid refreshment are offered under a large variety of brand names by a large number of manufacturers, virtually all of the containers for these beverages have identical threaded neck portions for receiving caps thereon. Accordingly, the receptacle portion 32 of the adapter 12 is capable of threaded engagement with virtually any bottle of this type (e.g. preferably a 16-ounce or two liter plastic soda pop bottle). The adapter 12 also includes a second connecting portion 36 which is in the form of a cylindrical projection extending outwardly from the flat surface 38 of the first connecting portion 32, the first and second connecting portions 32 and 36 being formed as one integral unit as best illustrated in FIG. 3, and it will also be noted that the cylindrical receptacle 32 and the cylindrical projection 38 lie on a common central axis.

To assemble and use the apparatus of the present invention, any available empty beverage container of the aforesaid type can be utilized, and the neck portion 16 thereof is threaded into the first receptacle connecting portion 32 until it is securely held thereat, and the second connecting portion 36 is inserted into the chuck 30 of the drill 14 and the chuck 30 is rotated in a conventional manner to close the jaws of the chuck 30 until the second connecting portion 36 is securely held thereby. With the several components assembled in this manner, the user of the apparatus manually unwinds several turns of one end portion of the used line 40 wrapped about a conventional fishing reel 42, and this end portion of the line 40 is then manually wrapped for several turns about the exterior cylindrical surface of the body portion 20 of the bottle 10 as illustrated in FIG. 2. The user then operates the trigger 26 to energize the drill 14, and the chuck 30 thereof is rotated at a rapid speed of rotation to also rotate the adapter 12 and the bottle 10 so that the line 40 is rapidly unwound from the fishing reel 42 and is rewound onto the exterior surface of the bottle 10. When this winding operation is completed, all of the used line which was on the fishing reel 42 will have been transferred to the exterior surface of the bottle 10 in an orderly manner, and the line 40 will be neatly wrapped around the exterior surface of the bottle 10. Accordingly, the bottle 10 can then be unscrewed from the receptacle portion 32 of the adapter 12, and the bottle 10 with the fishing line 40 thereon can be easily disposed of in the same manner that used beverage containers are normally disposed of.

In some winding operations using a plastic bottle 10, the tension of the fishing line being wound onto the bottle 10 may be sufficient to cause a partial collapse of the bottle 10 and adversely affect the smooth cylindrical surface onto which the line is being wound. To alleviate this potential problem, a conventional washer 44 made of elastomeric material may be inserted in the receptacle portion 32 of the adapter 12 as illustrated in FIG. 3, whereby when the neck portion 16 of the bottle 10 is tightly screwed into the receptacle portion 32 the washer 44 will seal the open end of the bottle 10 so that the air trapped within the bottle 10 will tend to resist any inward collapse of the bottle during the winding of fishing line thereabout.

The advantages which are derived from the present invention are numerous regardless of whether the present invention is used by the fisherman at home or in a boat, and they include the following principal advantages. First, it will be quickly apparent that the heretofore unpleasant and time-consuming chore of removing line from a fishing reel has been transformed into a simple operation that can be carried out easily, and in a short period of time. Thus, in using the apparatus of the present invention as described above, the three components can, if necessary, be assembled in a matter of seconds, and the fast rotational speed of the hand drill 14 causes the line to be unwound from the fishing reel 42 and onto the bottle 10 in a very short period of time. This is to be contrasted with the conventional method of removing line from a fishing reel wherein the line must be manually pulled from its reel, which takes a considerable amount of time and effort because only about one yard can be pulled off by hand on each pull. It will be appreciated that when used line is removed from a fishing reel using the conventional manual method, there is no convenient way to collect or store the line as it is being unwound, and it therefore usually accumulates in a large loose, disoriented pile of line, which creates a particular problem when the line is being removed by a fisherman within the confines of a small fishing boat where the accumulated pile of line is likely to become tangled around the feet of the fisherman or around other items in the boat. By contrast, the present invention permits the line to be neatly wrapped as a package around the exterior surface of the bottle 10. Additionally, the pile of line which accumulates using the conventional manual unwinding method must eventually be disposed of, and since it tends to create a nuisance, if not a hazard, within the confines of a small boat, fishermen frequently dispose of the used line improperly by simply dumping it over the side of the boat and into the water where it can create serious environmental problems by becoming tangled with fish and other wildlife, or by becoming entangled with mechanical equipment such as the screws of boat motors. Again, by substantial contrast, it will be noted that the line removed using the apparatus of the present invention is tightly wrapped about the bottle 10 in a neat manner, and since the bottle itself is a disposable item, the entire package, which is relatively small, can be readily stored or kept within even a small fishing boat until it can be properly put into an appropriate trash receptacle or the like in the same manner that any used beverage container would be thrown away. Finally, the apparatus of the present invention is simple to use and inexpensive to obtain. Most fishermen have, or can easily obtain, a relatively small and inexpensive portable drill that can be taken on boats and even stored within a typical fishing tackle box. Similarly, the adapter 12 is small and inexpensive to produce, and the bottle 10 is essentially a no-cost item that will invariably be found in any location where people are fishing.

Since fishermen are frequently required to remove line from a fishing reel, either because a more advanced fisherman will often wish to use a stronger or lighter line when fishing for different types of fish, or because the used line becomes old or tangled to a point that it must be replaced with new line, the present invention offers a number of advantages to such fisherman at a minimum expense. Moreover, because the present invention offers a device that is inexpensive and simple to operate, it can be used in lieu of having to take a reel to a tackle shop and suffer all of the disadvantages described above It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, it is within the scope of the present invention to substitute for the drill other motor driven rotatable chucks that can receive the second connecting portion of the adapter. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for unwinding fishing line from a fishing reel comprising:
   (a) a bottle having a threaded neck portion and an enlarged generally cylindrical body portion about which said fishing line can be wound;
   (b) a drive means having a motor-driven rotatable chuck that is adapted to receive and engage a connecting means inserted therein;
   (c) adapter means having a first connecting means for threadably engaging said neck portion to secure said adapter means thereto, and a second connecting means engaged by said chuck of said drive means to secure said adapter means thereto, whereby when said drive means is operated, said bottle will be rotated to withdraw said fishing line from said fishing reel and wind said fishing line on said bottle for disposal therewith.

2. Apparatus for unwinding fishing line from a fishing reel as defined in claim 1 and further characterized in that said drive means is a hand-held battery operated electric drill.

3. Apparatus for unwinding fishing line from a fishing reel as defined in claim 1 and further characterized in that said first connecting means of said adapter means includes a washer located to engage and seal the open end of said threaded neck portion of said bottle when it is secured to said adapter means.

4. A method of unwinding fishing line from a fishing reel, said method comprising the steps of:
   (a) securing an empty beverage bottle having a threaded neck portion and a body to an adapter having a threaded receptacle for receiving and engaging said neck portion;
   (b) securing said adapter to a drive means having a motor-driven rotatable chuck by inserting a projecting portion of said adapter into said chuck and tightening said chuck;
   (c) winding one end portion of said fishing line about the body of said bottle;
   (d) operating said drive means to rotate said bottle until said fishing line has been unwound from said fishing reel and wound onto the exterior surface of said bottle; and
   (e) removing said bottle with said fishing line wound thereon from said adapter for disposal.

* * * * *